United States Patent [19]

Uchida et al.

[11] Patent Number: 5,355,044
[45] Date of Patent: Oct. 11, 1994

[54] ROTOR STRUCTURE OF AN ELECTRIC SYNCHRONOUS MOTOR TECHNICAL FIELD

[75] Inventors: Hiroyuki Uchida; Tomonaga Yamamoto; Takashi Okamoto, all of Yamanashi, Japan

[73] Assignee: Fanuc Limited, Yamanashi, Japan

[21] Appl. No.: 793,345

[22] PCT Filed: May 15, 1991

[86] PCT No.: PCT/JP91/00640
§ 371 Date: Jan. 14, 1992
§ 102(e) Date: Jan. 14, 1992

[87] PCT Pub. No.: WO91/18439
PCT Pub. Date: Nov. 28, 1991

[30] Foreign Application Priority Data

May 15, 1990 [JP] Japan .................. 2-122893

[51] Int. Cl.$^5$ ............................ H02K 21/00
[52] U.S. Cl. .................... 310/162; 310/156; 310/261
[58] Field of Search .......... 310/156, 162–165, 310/261, 216, 218, 114, 262, 264, 265

[56] References Cited

U.S. PATENT DOCUMENTS

| | | | |
|---|---|---|---|
| 4,642,502 | 2/1987 | Carpenter et al. | 310/216 |
| 4,739,201 | 4/1988 | Brigham | 310/156 |
| 4,868,438 | 9/1989 | Okamoto | 310/261 |
| 4,871,934 | 10/1989 | Okamoto | 310/261 |
| 5,039,897 | 8/1991 | Iwamatsu | 310/156 |

FOREIGN PATENT DOCUMENTS

| | | |
|---|---|---|
| 3200418 | 2/1983 | Fed. Rep. of Germany . |
| 60-66657 | 4/1985 | Japan . |
| 61-199446 | 9/1986 | Japan . |
| 61-199447 | 9/1986 | Japan . |
| 62-12358 | 1/1987 | Japan . |
| 62-239851 | 10/1987 | Japan . |
| 63-140645 | 6/1988 | Japan . |
| 63-124072 | 8/1988 | Japan . |

*Primary Examiner*—R. Skudy
*Attorney, Agent, or Firm*—Nikaido, Marmelstein, Murray & Oram

[57] ABSTRACT

To reduce torque ripples appearing in an output torque of an electric synchronous motor, the rotor (10) is divided into $2^n$ rotor elements (101, 102, 103, and 104) the rotor elements of each of $2^{n-1}$ pairs of rotor elements (101, 102; 103, 104) being circumferentially shifted from one another around an axis of the rotor by an angle corresponding to a half of the wavelength ($\lambda$) of a first (A) of "n" kinds of cyclic torque ripples (A and B) to cancel the first kind of torque ripple, and the $2^{n-1}$ pairs of rotor elements (101, 102; 103, 104) being arranged to be grouped in $2^{n-2}$ sections of rotor elements, each section including two pairs of rotor elements, and the $2^{n-2}$ sections of rotor elements being circumferentially shifted from one another around the axis of the rotor by an angle corresponding to a half of a wavelength ($\lambda$) to cancel a second of the "n" kinds of torque ripple, and eventually, the rotor structure being structured so that the rotor elements are further circumferentially shifted from one another to cancel the "n"th torque ripple component.

3 Claims, 4 Drawing Sheets

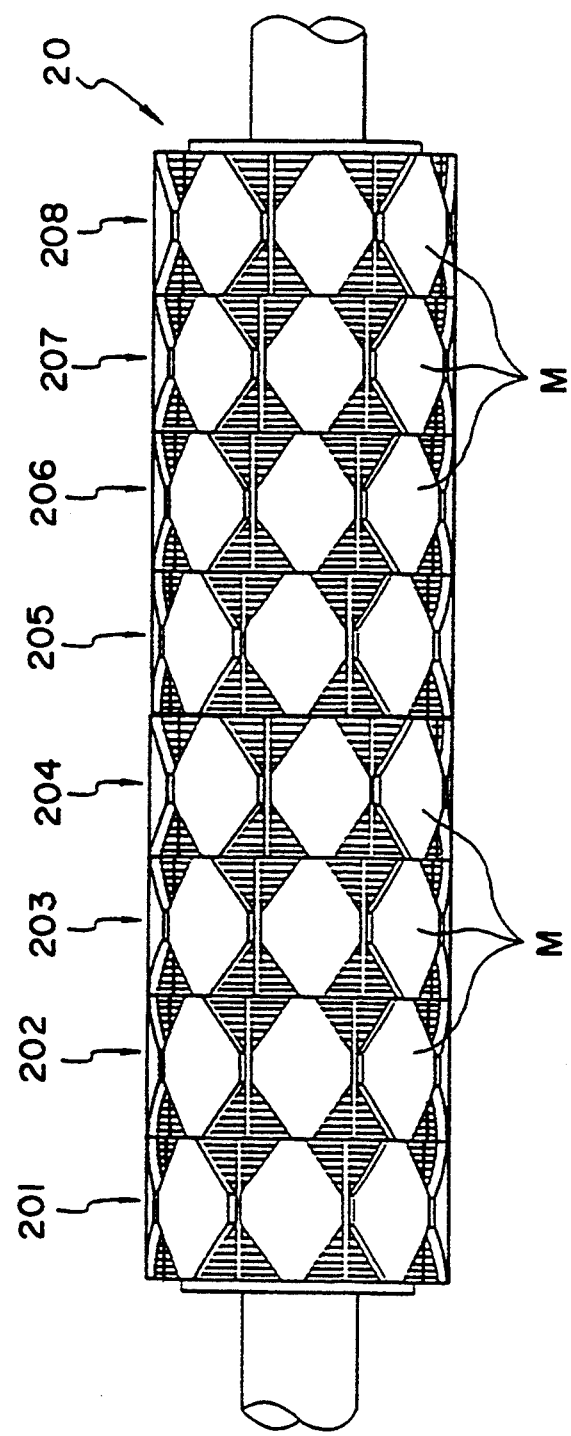

ROTOR STRUCTURE OF AN ELECTRIC SYNCHRONOUS MOTOR TECHNICAL FIELD

TECHNICAL FIELD

The present invention relates to a rotor structure of an electric synchronous motor, which is capable of cancelling a plurality of torque ripple components.

BACKGROUND ART

A conventional electric synchronous motor in which permanent magnets are used to construct a rotor thereof employs methods of reducing ripples in an output torque therefrom such as using a particular shaping of each of the permanent magnets or axially separating the rotor into a plurality of rotor components and arranging these rotor components to occupy one of two positions angularly displaced from one another about an axis of the rotor.

Nevertheless, the method of using a particular shaping of the permanent magnets is unable to completely cancel torque ripples from the output torque of the motor. Further, the method of arranging a plurality of rotor components of a synchronous motor at two angularly displaced positions fails to cancel all different torque ripples having respective different cycles, except for some specific torque ripples.

DISCLOSURE OF THE INVENTION

Accordingly, an object of the present invention is to provide a rotor structure of an electric synchronous motor, which is capable of cancelling a plurality of cyclic torque ripple components from an output torque of the motor.

In view of the above object of the invention, the present invention provides a structure of a permanent-magnet-included rotor for an electric synchronous motor generating an output torque containing therein "n" kinds of cyclic torque ripple components, the rotor being divided into $2^n$ rotor elements having an equal longitudinal length respectively, these rotor elements being grouped into first through $2^{n-1}$th pairs of rotor elements, and each pair of rotor elements including two rotor elements circumferentially shifted by an angle corresponding to a half of a wavelength of a first of the "n" kinds of torque ripple components, the $2^{n-1}$ pairs of said rotor elements being grouped into first through $2^{-2}$th rotor sections, each rotor section including two said rotor-element pairs arranged to be circumferentially shifted by an angle corresponding to a half of a wavelength of a second of the "n" kinds of torque ripple components, and in turn, said rotor elements being finally grouped into two groups of rotor elements, said two groups being arranged to be circumferentially shifted from one another by an angle corresponding to a half of a wavelength of "n"th of the "n" kinds of torque ripple components.

In accordance with the above rotor structure for an electric synchronous motor, the arrangement of the $2^{n-1}$ rotor-element pairs circumferentially shifted by an angle corresponding to the half of the first of the "n" kinds of torque ripple components contributes to a cancelling of said first of the "n" kinds of torque ripple components, and the arrangement of the first through $2^{n-2}$th rotor sections further contributes to a cancelling of the second of the "n" kinds of torque ripple components, and in turn, the arrangement of the two groups of rotor elements finally contributes to a canceling of the "n"th of the "n" kinds of torque ripple components. Thus, the permanent magnet-included rotor for the synchronous motor initially must be manufactured to include $2^n$ rotor elements.

BRIEF DESCRIPTION OF THE DRAWINGS

FIG. 4 is a front view of the rotor structure embodiment explained in FIG. 3.

BEST MODE OF CARRYING OUT THE INVENTION

The present invention will become more apparent from the ensuing description of the embodiments of the present invention with reference to the accompanying drawings.

Figure 1:
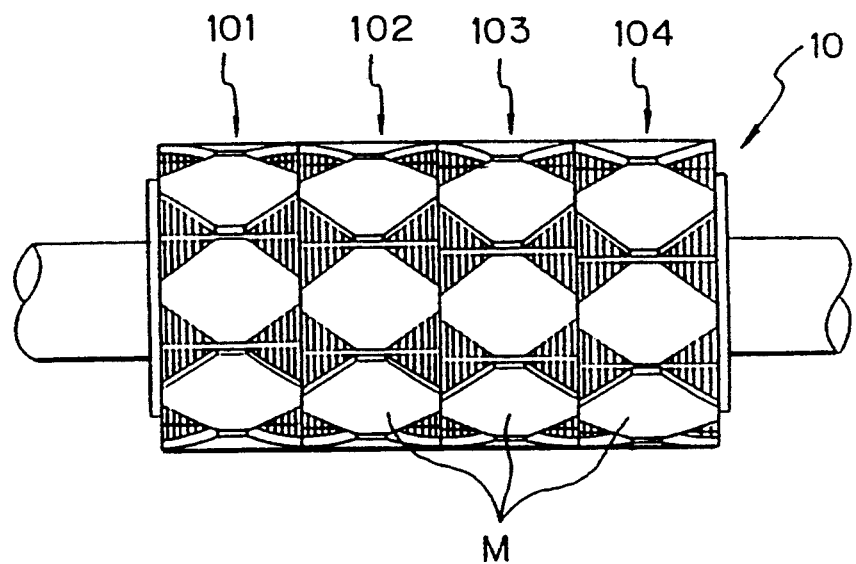
FIG. 1 is a front view of a rotor structure of an electric synchronous motor according to the present invention.

Referring to FIG. 1, a rotor 10 for an electric synchronous motor, having permanent magnets M, includes $2^2$, i.e., four separate rotor elements 101, 102, 103 and 104 arranged to be at four stages from the left to the right in the longitudinal direction of the rotor and having an equal axial length, respectively, and capable of exhibiting an equal extent of a magnetic field, respectively. The illustrated embodiment of the rotor structure is able to cancel two kinds of torque ripple components from an output torque, i.e., a torque ripple component A having a wavelength "$\lambda$", and a torque ripple component B having a wavelength "$\gamma$" as shown in FIG. 2.

Figure 2:
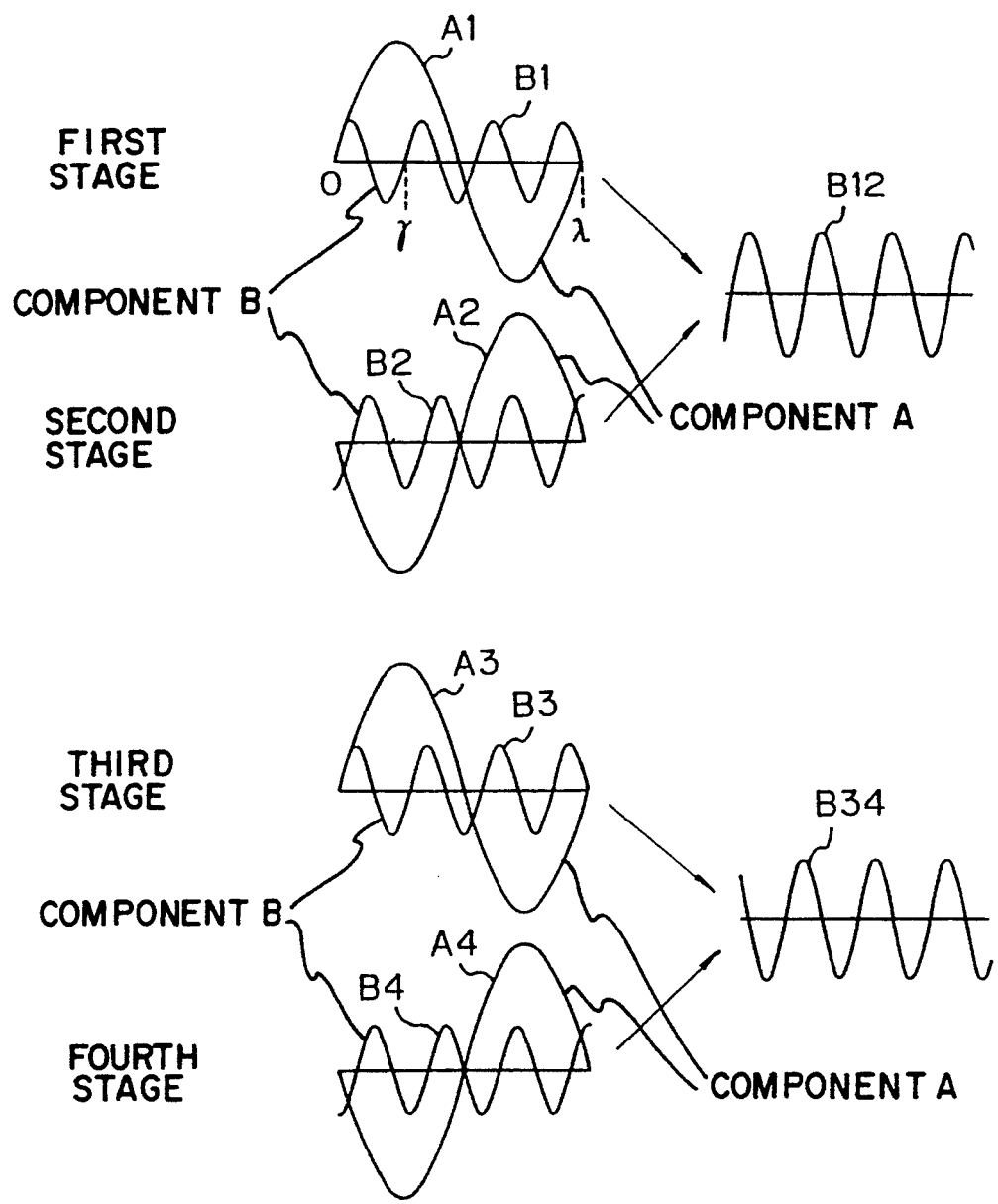
FIG. 2 is a schematic graphical view explaining an operation of the rotor structure of FIG. 1.

The rotor elements 101 and 102 of FIG. 1 at the first and second stages shown in FIG. 2 form one pair of rotor elements for cancelling the torque ripple component A having the wavelength $\lambda$, and the rotor elements 103 and 104 at the third and fourth stages form another pair of rotor elements also for cancelling the torque ripple component A having the wavelength $\lambda$. Namely, the rotor element 102 at the second stage is circumferentially shifted from the rotor element 101 at the first stage by a physical angle corresponding to a half of the wavelength $\lambda$, and the rotor element 104 at the fourth stage is circumferentially shifted from the rotor element 103 at the third stage by the same physical angle as the above-mentioned angle. As shown in FIG. 2, the torque ripple components A1 and B1 appear in an output torque exerted from the rotor 10, and the torque ripple components A2 and B2 appear in the output torque exerted from the rotor. It will be understood from the illustration of FIG. 2 that, since the latter torque ripple components A2 and B2 have a displacement "$\lambda/2$" with respect to the former torque ripple components A1 and B1, the torque ripple components A1 and A2 cancel one another out while the torque ripple components B1 and B2 having the wavelength $\gamma$ are superimposed on one another to generate a different torque ripple components B12, the wavelength of which is the same as that "$\gamma$" of the torque ripple components B1 and B2, but the width of which is different from the torque ripple components B1 or B2.

Further, a like canceling and superimposing of the torque ripple components A3 and A4 of the output torque from the rotor 10 occurs with respect to the third and fourth stage rotor elements 103 and 104, as shown in FIG. 2. Namely, the torque ripple components A3 and A4 having a displacement "λ/2" cancel one another out, and the torque ripple components B3 and B4 are superimposed on one another to generate a different torque ripple component B34 having the same wavelength γ and width as those of the above-mentioned torque ripple component B12. Accordingly, when the first pair of rotor elements 101 and 102 and the second pair of rotor elements 103 and 104 are arranged to be circumferentially shifted from one another by a physical angle corresponding to a half of the wavelength γ of the torque ripple components B12 and B34, these torque ripple components B12 and B34 can cancel one another out, and consequently, two kinds of cyclic torque ripple components A and B can be completely removed from the output torque of the rotor.

Figure 3:
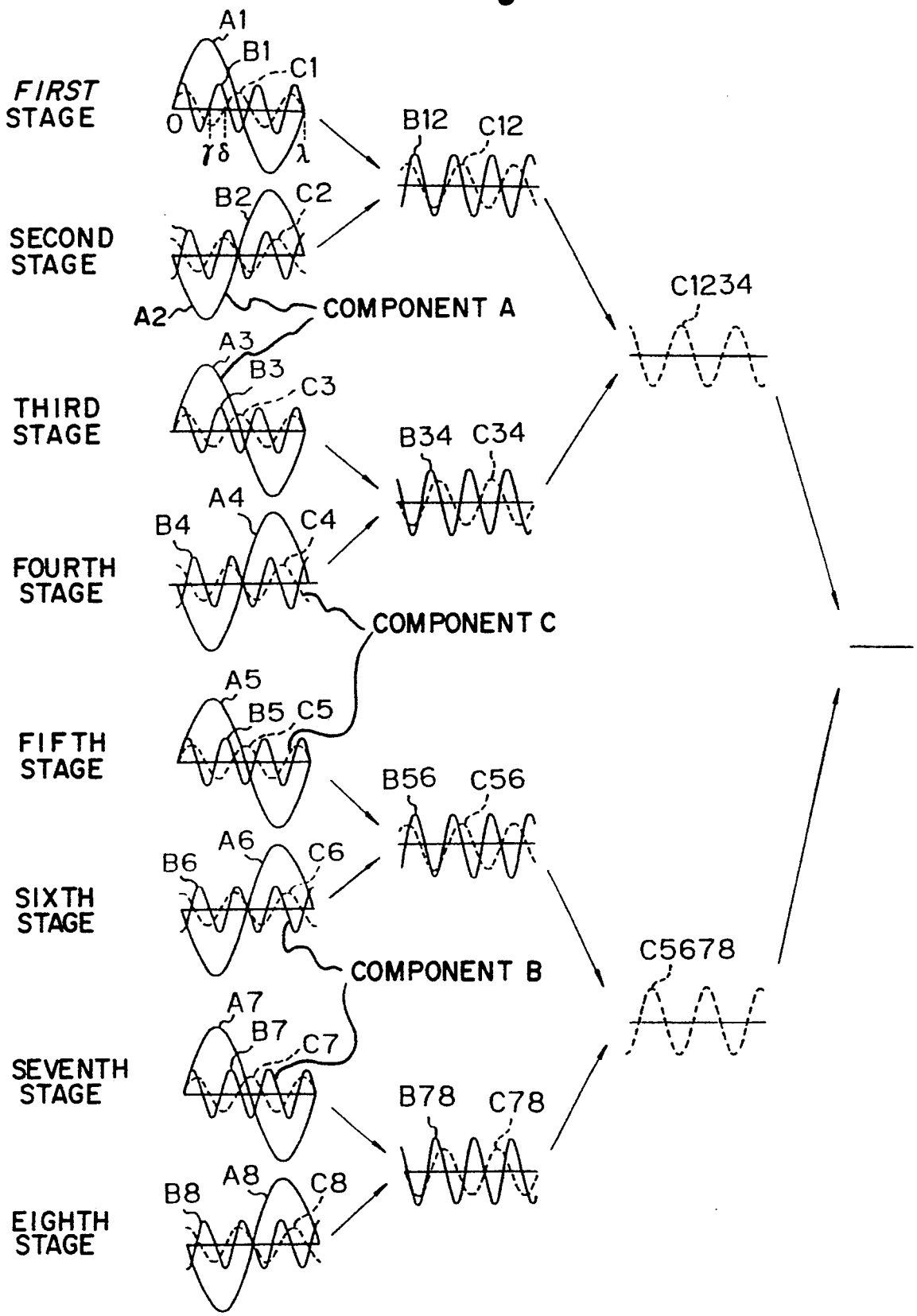
FIG. 3 is a schematic graphical view explaining an operation of a rotor structure according to another embodiment of the present invention.

Referring now to FIG. 3, another case is shown wherein three different torque ripple components A (the wavelength: λ), B (the wavelength: γ), and C (the wavelength: δ) contained in an output torque exerted from an electric synchronous motor are cancelled by a permanent-magnet included rotor structure of a synchronous motor according to a different embodiment of the present invention.

FIG. 4 shows a rotor structure similar to that of FIG. 1 but including a rotor 20 that has $2^3$, i.e., eight separate rotor elements 201–208 providing four additional stages so as to enable cancellation of three different torque ripple components.

In this embodiment, the rotor is constructed by $2^3$ equal rotor elements ($2^n$ elements where n=3, i.e. eight elements) axially arranged side by side, in the same manner as in the embodiment of FIG. 1.

Similar to the embodiment of FIG. 2, the rotor of this embodiment has an arrangement such that first and second stage rotor elements constitute a first pair of rotor elements, the third and fourth stage rotor elements constitute a second pair of rotor elements, the fifth and sixth stage rotor elements constitute a third pair of rotor elements, and the seventh and eighth stage rotor elements constitute a fourth pair of rotor elements, and that the two rotor elements of each of the first through fourth pair of rotor elements are arranged to be circumferentially shifted around the axis of the rotor by a physical angle corresponding to "λ/2" so that cyclic torque ripple components A1 and A2, A3 and A4, A5 and A6, and A7 and A8 cancel one another out. Nevertheless, cyclic torque ripple components B12 and C12 having the wavelengths γ and δ still remain in an output torque exerted by the first pair of rotor elements of the rotor. Also, cyclic torque ripple components B34 and C34, B56 and C56, and B78 and C78 having the wavelengths γ and δ, respectively, remain in an output torque exerted by the second through fourth pairs of rotor elements of the rotor. At this stage, since the first pair of rotor elements including the first and second stage rotor elements and the second pair of rotor elements including the third and fourth stage rotor elements are circumferentially shifted around the axis of the rotor by a physical angle corresponding to a half of the wavelength "γ", i.e., γ/2, the torque ripple components B12 and B34 cancel one another out. Similarly, since the third pair of rotor elements including the fifth and sixth stage rotor elements and the fourth pair of rotor elements including the seventh and eighth stage rotor elements are circumferentially shifted around the axis of the rotor by the same physical angle as the abovementioned angle "λ/2", the torque ripple components B56 and B78 having the wavelength λ cancel one another out. When the torque ripple component B is canceled, the cyclic torque ripple component C, i.e., the components C1234 and C5678 still remain in an output torque exerted by the rotor. At this stage, as a first section of rotor elements of the rotor including the first and second pairs of rotor elements, i.e., the first through fourth stage rotor elements and a second section of rotor elements of the rotor including the third and fourth pairs of rotor elements, i.e., fifth through eight stage rotor elements are circumferentially mutually shifted around the axis of the rotor by a physical angle corresponding to a half of the wavelength δ, i.e., δ/2, of the torque ripple component C, the torque ripple components C1234 and C5678 cancel one another out. Accordingly, all of the three kinds of torque ripple components A, B and C appearing in the output torque exerted by the rotor of this embodiment can be cancelled.

When four or more cyclic torque ripple components are contained in an output torque of a permanent-magnet included rotor of an electric synchronous motor, it is possible to cancel the torque ripples by applying the same shifting structure as those described above to the structure of a permanent-magnet included rotor for an electric synchronous motor having $2^n$ equal rotor elements.

From the foregoing description, it will be understood that, in accordance with the present invention, a rotor structure for an electric synchronous motor can cancel a plurality of kinds of cyclic torque ripple components from an output torque of the motor.

What is claimed is:

1. A rotor for an electric synchronous motor comprising a rotor shaft, a rotor core fixed to the rotor shaft and a plurality of circumferentially arranged magnets accommodated in the rotor core, said rotor being capable of eliminating three different cyclic torque ripple components, wherein said rotor core comprises eight separate equal rotor elements arranged axially on said rotor shaft and independently positionable circumferentially with respect to each other, said eight separate equal rotor elements being positioned in an arrangement which comprises:

a first sub-arrangement of said eight separate equal rotor elements into four pairs of elements wherein one element of each pair is circumferentially shifted with respect to the other element of the pair by an angle corresponding to a half-wavelength of a first cyclic torque ripple component to cancel said first cyclic torque ripple component;

a second sub-arrangement of said eight separate equal rotor elements into four groups of two elements each, wherein two elements of each group are shifted with respect to the other two elements of the group by an angle corresponding to a half-wavelength of a second cyclic torque ripple component of smaller wavelength than said first cyclic torque ripple component to cancel said second cyclic torque ripple component; and a third sub-arrangement of said eight separate equal rotor elements into two groups of four elements each wherein the elements of one group are circumferentially shifted with respect to the elements of the other group by an angle corresponding to a half-wavelength of a third cyclic torque ripple component of smaller wavelength than said second cyclic torque ripple component to cancel said third cyclic torque ripple component.

2. A rotor for an electric synchronous motor according to claim 1, wherein each of said eight separate equal rotor elements is provided with a plurality of said circumferentially arranged magnets, which are attached to a circumferential surface of each separate equal rotor element.

3. A rotor for an electric synchronous motor comprising a rotor shaft, a rotor core fixed to the rotor shaft and a plurality of circumferentially arranged magnets accommodated in the rotor core, said rotor being capable of eliminating more than two different cyclic torque ripple components, wherein said rotor core comprises a number $2^n$ of separate equal rotor elements, wherein n is an integer larger than 2, arranged axially on said shaft and independently positionable circumferentially with respect to each other, and wherein said rotor elements are circumferentially positioned in an arrangement which comprises:

- a first sub-arrangement of said $2^n$ separate equal rotor elements into $2^{-n}$ pairs ($2^1$) of elements wherein one element of each pair is circumferentially shifted with respect to the other element of the pair by an angle corresponding to a half-wavelength of a first cyclic torque ripple component to cancel said first cyclic torque ripple component;
- a second sub-arrangement of said $2^n$ separate equal rotor elements into $2^{n-2}$ groups of four ($2^2$) elements each, wherein two preselected elements of each group are circumferentially shifted with respect to the other two elements of the same group by an angle corresponding to a half-wavelength of a second cyclic torque ripple component of smaller wavelength than said first cyclic torque ripple component to cancel said second cyclic torque ripple component;
- subsequent further sub-arrangements of said $2^n$ separate equal rotor elements into successively larger groups of elements wherein one half of the separate equal rotor elements of each group are circumferentially shifted with respect to the other half of the elements of the same group by an angle corresponding to a half-wavelength of further cyclic torque ripple components of successively smaller wavelengths to cancel such further cyclic torque ripple components; and
- a final $n^{th}$ sub-arrangement of said $2^n$ separate equal rotor elements into two groups of n/2 elements each wherein the elements of one of said two groups are circumferentially shifted with respect to the other group by an angle corresponding to a half-wavelength of an $n^{th}$ smaller wavelength cyclic torque ripple component to cancel said $n^{th}$ smaller wavelength cyclic torque ripple component.

* * * * *